Patented June 23, 1942

2,287,124

UNITED STATES PATENT OFFICE 2,287,124

PROCESS OF DYEING

Henry Charles Olpin and John Wright, Spondon, near Derby, England, assignors to Celanese Corporation of America, a corporation of Delaware No Drawing. Application May 14, 1940, Serial No. 335,145. In Great Britain June 7, 1939

4 Claims. (Cl. 8—50)

This invention relates to the manufacture of new azo dyes and to the application of these dyes for the production of coloured cellulose ester or ether textile and other products.

It has been found that 2:6-dihalogen-4-nitro-benzene-azo-arylamines having a primary amino group in para position to the azo group are valuable dyestuffs for cellulose acetate and other cellulose ester or ether materials. With the aid of dyes of this type, it is possible to dye cellulose acetate materials directly in various shades of orange, and particularly in golden orange shades, which are of excellent fastness to light, and moreover of much better fastness to washing than the shades obtained with the majority of direct dyeing azo dyes for cellulose acetate.

According to the invention, azo dyes of the above-mentioned type are obtained by coupling a diazotised 2:6-dihalogen-4-nitro-aniline with a primary aromatic amine capable of coupling in para position to the primary amino group.

As the diazo components can be employed the 2:6-dichlor-, 2:6-dibrom-, and 2-chlor-6-brom-derivatives of 4-nitro-aniline.

As coupling components it is preferred to use primary mono-amines of the benzene series, for example, m-halogen-anilines, m-toluidine, 3-chlor-6-methoxy-aniline, p-xylidine and cresidine (3-amino-4-methoxy-1-methyl-benzene).

Again, according to the invention, azo dyes of the above-mentioned type are obtained by coupling a diazotised 2:6-dihalogen-4-nitro-aniline with an N-α-sulpho-alkyl or other N-substituted derivative of a primary aromatic amine, for example the sulphamic or nitramic acid of the amine, the said derivative being one which is capable of coupling in para position to the amino group, and from which the N-substituent is readily removable, e. g. by hydrolysis, and thereafter removing said N-substituent. The N-α-sulpho-alkyl compounds, such as can be obtained by acting on the primary amine with an aldehyde and a bisulphite or with an aldehyde-bisulphite compound (e. g. the N-sulphomethyl compounds obtainable by the action of formaldehyde-bisulphite), are particularly advantageous. The N-α-sulpho-alkyl group can readily be split off, for example by heating with aqueous alkali. Examples of primary amines which can be coupled in this way are aniline and m-chloraniline, in addition to those mentioned above.

The manufacture of the products containing the N-substituents, which are themselves dyes for cellulose esters and ethers, is included within the scope of the invention.

The invention also includes the colouration of cellulose ester or ether textile and other products with the above-mentioned dyes.

Particularly valuable dyes are 2:6-dihalogen-4-nitro-4'-amino-azo-benzene and the nuclear substitution products containing a substituent in the 2'-position but otherwise free from nuclear substituents. The 2:6-dichlor-4-nitro-4'-amino-azo-benzene and 2:6-dichlor-4-nitro-4'-amino-2'-chlor-azo-benzene dye cellulose acetate directly in very desirable golden orange shades which are of excellent fastness to light and of very good fastness to washing. Moreover, the dyeings can be discharged to white, for example by means of zinc formaldehyde sulphoxylate.

The new water-insoluble dyes are conveniently applied to cellulose acetate or other cellulose ester or ether materials in the form of aqueous dispersions. These can be made in various ways, for example by treating the dyes with water and dispersing agents with or without protective colloids, by dissolving the dyes in water-miscible organic solvents and pouring the solutions into water, preferably in the presence of protective colloids, or by milling or grinding the dyes in water with or without the addition of dispersing agents and/or protective colloids.

The invention includes concentrated preparations of the dyes, e. g. preparations containing 5% or more of dye, the said preparations comprising the dyes and dispersing agents. These preparations may be in liquid or paste form or in powder or other solid form. They can readily be converted into dye-baths, printing pastes, etc. by mixing with water and any desired or necessary additional materials, e. g. thickening agents, swelling agents for the material to be coloured, or further dispersing agents.

The dyes can be applied to cellulose ester or ether textile materials by either dyeing methods or by printing, padding or other mechanical impregnation methods. In the case of mechanical impregnation methods a subsequent steaming treatment will in general be required to fix the dye on the material.

As mentioned above, according to one method of manufacture the dyes are obtained in the form of N-α-sulpho-alkyl derivatives or other N-substituted derivatives. These derivatives are not only of value as intermediate products in the production of the dyes but can themselves be employed as dyes for cellulose ester or ether materials. They can, for instance, be used in the form of aqueous solutions for the colouration of the said materials.

The new dyes are of particular value for the colouration of cellulose acetate textile and other materials. They may, however, be used for the colouration of materials of other cellulose esters, for example materials of cellulose formate, propionate, butyrate, or aceto-butyrate. Again, they may be used for the colouration of cellulose ether materials, for instance materials of ethyl, methyl or benzyl cellulose.

The invention is illustrated by the following example, the parts referred to being parts by weight:

Example 1

To a solution containing 27.5 parts of sodium bisulphite in 42 parts of water is added 20 parts of commercial formaldehyde solution of 40% strength and the mixture maintained at 60° C. for half an hour. It is made neutral to litmus by addition of further commercial formaldehyde or bisulphite as may be necessary. 35 parts of water and 23.5 parts of aniline are then added and the mixture heated at 60–65° C. for 1 to 1½ hours, whereupon it is diluted with water to 1000 parts. Into the said solution is then run a diazo solution made by diazotising 52.5 parts of 2:6-dichlor-4-nitro-aniline with nitrosyl-sulphuric acid, and pouring on to ice and water and filtering from any insoluble product. During the coupling mineral acid acidity is avoided by the addition of sodium acetate. When coupling is complete the product is filtered, made into a paste with water and sufficient caustic alkali to form a 5% solution thereof, and heated at 90–95° C. for 1–1½ hours. The product is then filtered off, washed and preserved as a paste of about 10% strength. It yields golden orange shades on cellulose acetate when applied from a soap bath.

A similar product is obtained by substituting 32 parts of m-chlor-aniline for the 23.5 parts of aniline specified above.

Example 2

37 parts of cresidine are dissolved in 3000 parts of water and 20 parts sulphuric acid and filtered if necessary. Into the solution is then run a diazo solution made by diazotising 52.5 parts of 2:6-dichlor-4-nitro-aniline with nitrosyl-sulphuric acid, and pouring on to ice and water and filtering from any insoluble product. During the coupling mineral acid acidity is avoided by the addition of sodium acetate. When coupling is complete the product is filtered, washed and preserved as a paste of about 10% strength. It yields golden brown shades on cellulose acetate when applied from a soap bath.

Having described our invention, what we desire to secure by Letters Patent is:

1. Process for the coloration of textile materials of an organic derivative of cellulose which comprises applying thereto 2:6-dichlor-4-nitro-2'-chlor-4'-amino azobenzene.

2. Process for the coloration of cellulose acetate textile material, which comprises applying thereto 2:6-dichlor-4-nitro-2'-chlor-4'-amino-azobenzene.

3. A textile material of an organic derivative of cellulose colored with 2:6-dichlor-4-nitro-2'-chlor-4'-amino-azobenzene.

4. Cellulose acetate textile material colored with 2:6-dichlor-4-nitro-2'-chlor-4'-amino-azobenzene.

HENRY CHARLES OLPIN.
JOHN WRIGHT.